US006295812B1

(12) United States Patent
Hsu

(10) Patent No.: US 6,295,812 B1
(45) Date of Patent: Oct. 2, 2001

(54) HYDRAULIC JACK

(76) Inventor: Kun-Shan Hsu, No. 16, Lane 175, Hai Kuo Liao Rd., Pei Hu Li, Chiayi City (TW)

( * ) Notice: Subject to any disclaimer, the term of this patent is extended or adjusted under 35 U.S.C. 154(b) by 0 days.

(21) Appl. No.: 09/567,257

(22) Filed: May 9, 2000

(51) Int. Cl.[7] .................................................. F16D 31/02
(52) U.S. Cl. ............................ 60/482; 91/29; 254/93 H
(58) Field of Search ......................... 91/28, 29; 60/479, 60/482, 481; 254/93 H

(56) References Cited

U.S. PATENT DOCUMENTS 5,937,647 * 8/1999 Hung ..................................... 60/482
6,042,985 * 3/2000 Tang .................................. 254/93 H

* cited by examiner

*Primary Examiner*—Edward K. Look
*Assistant Examiner*—Thomas E. Lazo
(74) *Attorney, Agent, or Firm*—Hedman & Costigan, P.C.

(57) ABSTRACT

A hydraulic jack includes a moveable base seat. A lift arm, a handle and a hydraulic driver each mounted on the base seat. The hydraulic driver is driven by the handle to push the lift arm to lift an object. The hydraulic jack has a compound piston assembly and a hydraulic driver with fluid paths by which the jack can adjust the lift capacity so as to lift quickly and lower slowly.

2 Claims, 10 Drawing Sheets

HYDRAULIC JACK

BACKGROUND OF THE INVENTION

1. Field of the Invention

The present invention relates to a jack, and more particularly to a hydraulic jack that can adjust the lift capacity to lift quickly and lower slowly.

2. Description of Related Art

A conventional jack includes a lift arm and a handle mounted on a movable base seat. A hydraulic driver is mounted on the base seat and has a base member with a compound path. A container to hold hydraulic fluid, a release valve and a drive piston to drive a lift arm are mounted on the-base member. The conventional jack employs hydraulic power to extend the drive piston which has a lift arm connected to the distal end. The lift arm can engage an object such as the frame of a car, so that the lift arm can lift the object by extending the lifting piston.

However, the lift capacity of the conventional hydraulic jack is fixed so that the user must choose a jack suitable for the weight of the object to be lifted. Consequently, a jack may not be able to lift an object because of inadequate lift capacity or lifts a light object too slowly due to excessive lift capacity.

The present invention has arisen to mitigate and/or obviate the disadvantages of the conventional hydraulic jack.

SUMMARY OF THE INVENTION

In accordance with the present invention, a hydraulic jack has a compound piston assembly and a hydraulic driver with fluid path by which the jack can adjust the lift capacity so as to lift quickly and lower slowly.

Further benefits and advantages of the present invention will become apparent after a careful reading of the detailed description with appropriate reference to the accompanying drawings.

DETAILED DESCRIPTION OF THE INVENTION

Figure 1:
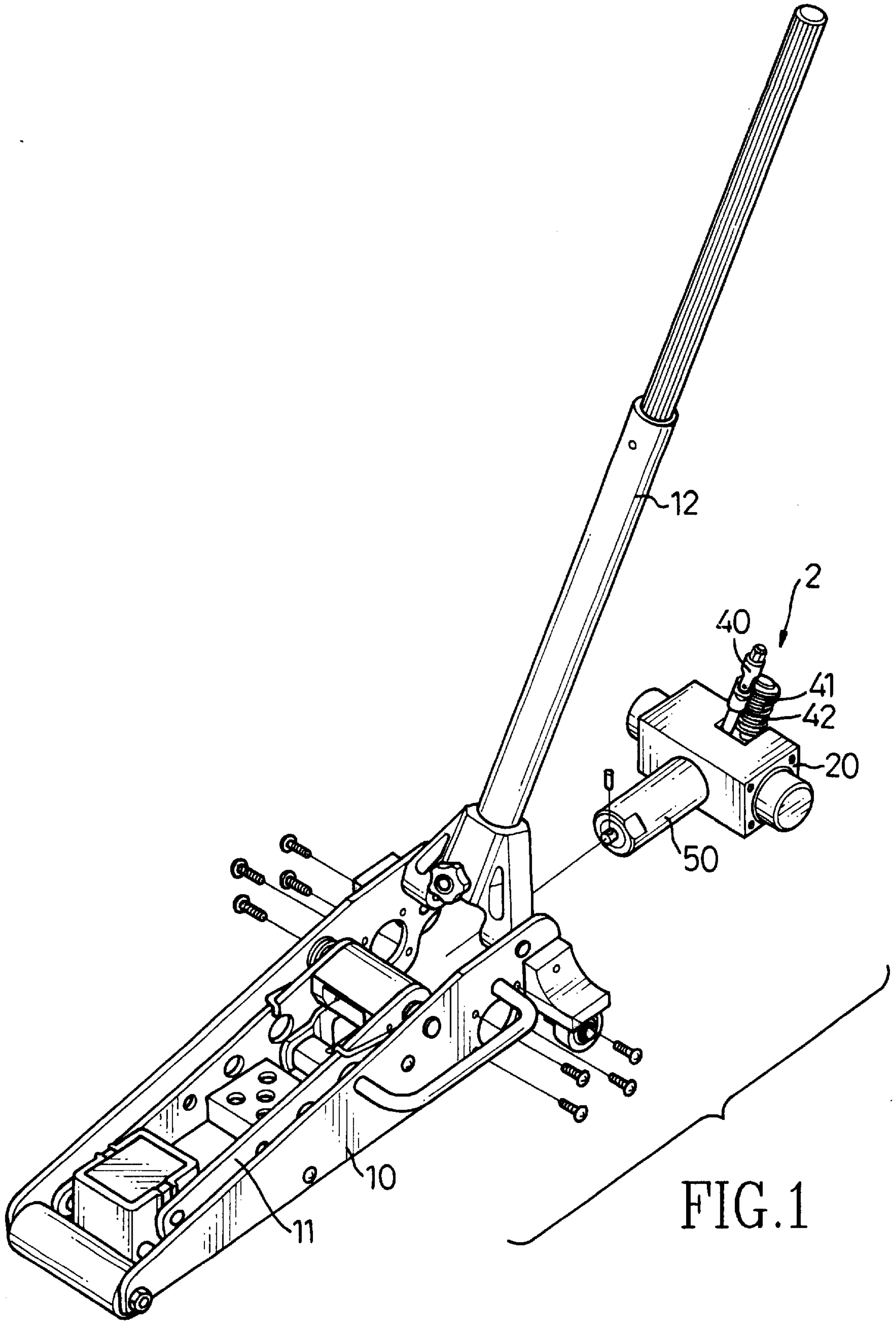
FIG. 1 is a perspective view of a hydraulic jack in accordance with the present invention.
Figure 2:
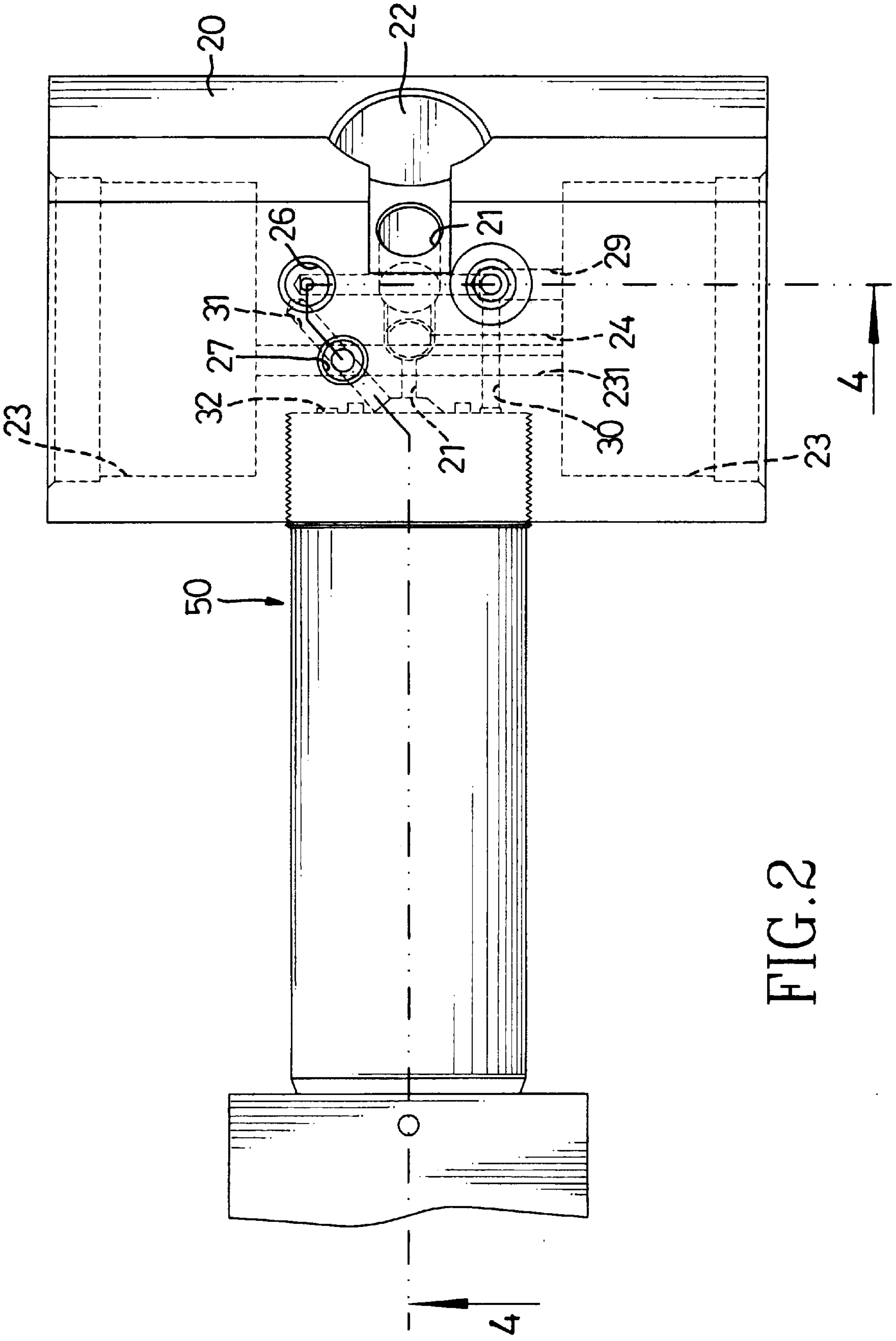
FIG. 2 is an enlarged partial top plan view of the hydraulic jack in FIG. 1.

Referring to the drawings and initially to FIG. 1, a hydraulic jack in accordance with the present invention comprises a lift arm (11) and a handle (12) pivotally mounted on a base seat (10) and a hydraulic driver (2). The hydraulic driver (2) is mounted on the base seat (10) under the handle (12) to drive the lift arm (11).

Referring to FIGS. 1–4, the hydraulic driver (2) comprises a base member (20) that includes a piston assembly (50) mounted on one end to drive the lift arm (11) and a fluid chamber (22) and a release path (21) in the other end. The release path (21) extends to the piston assembly (50). A release valve (40) is mounted to communicate with the release path (21) in the base member (20) and partially extending out from the base member (20). A drive piston (41)is slidably mounted in the fluid chamber (22) to pump fluid into the paths of the jack and a spring (42) is compressively mounted around the drive piston (41). The base member (20) has two opposite sides each having a recess (23) defined therein. A container (44) is mounted on each of these recesses (23) to receive fluid. A first path (231) is defined to communicate with these two recesses (23) in the base member (20). A reversed path (24) is defined to communicate with the release path (21) and the recess (23). The reversed path (24) is always closed by the release valve (40) but opened when the jack is being released.

A first, second and third vertical path (25,26,27) is defined in the base member (20). A first, second and third horizontal path (29, 30, 31) is defined in the base member (20).

One end of the first vertical path (25) connects to the recess (23) via a second path (28). A filter (281) is mounted between the second path (28) and the recess (23) to prevent impurities from entering the paths of the hydraulic driver (2). The first horizontal path (29) communicates with the middle portion of the first vertical path (25) and the lower end of the second vertical path (26). The middle portion of the first horizontal path (29) communicates with the fluid chamber (22). The second horizontal path (30) communicates between the upper end of the first vertical path (25) and the piston assembly (50). The lower end of the third vertical path (27) communicates with the first path (231).

A first ball check valve (251) is mounted in the first vertical path (25) between the second path (28) and the first horizontal path (29) to prevent the hydraulic fluid from reversing and flowing into the recess (23) through the second path (28). A first pressure control valve (252) is mounted in the first vertical path (25) between the first horizontal path (29) and the second horizontal path (30) to prevent the fluid form reversing and flowing into the fluid chamber (22) through the first horizontal path (29). The first pressure control valve (252) can be opened in a low-load condition. The third horizontal path (31) communicates with the lower end of the second vertical path (26) and the third vertical path (27) to allow the hydraulic fluid to flow into the piston assembly (50) via the third vertical path (27). A second pressure control valve (261) is mounted in the second vertical path (26) between the first and the second horizontal paths (29, 30) to prevent the hydraulic fluid from reversing and flowing into the fluid chamber (22) via the first horizontal path (29). The second pressure control valve (261) will be opened in a high-load condition. A second ball check valve (271) is mounted in the third vertical path (27) between the first path (231) and the third horizontal path (31) to prevent the hydraulic fluid from reversing and flowing into the recess (23) via the first path (231). A groove (32) is defined at the junction of the base member (20) and the piston assembly (50) and communicates with the second horizontal path (30) and the release path (21).

The piston assembly (50) includes a cylinder (51) mounted on the base member (20) with a first chamber (511)

defined in the cylinder (51). A piston (52) is slidably mounted in the first chamber (511) of the cylinder (51) and partially extends through the cylinder (511) to connect to the lift arm (11). A second chamber (521) defined in the piston (52). An internal rod (53) is securely mounted in the first chamber (51) and received in the second chamber (521) of the piston (52). A passage (531) is defined along the axis of the internal rod (53). The passage (531) communicates with the third horizontal path (31) via the third vertical path (27). One end of the internal rod (53) near the base member (20) has an inlet (532) defined to communicate the groove (32) and the first chamber (511). A through hole (533) is defined to communicate with the inlet (532) and the passage (531). A third ball check valve (534) is mounted in the through hole (533) to allow the hydraulic fluid to flow from the passage (531) to the inlet (532) and prevent the hydraulic fluid from reversing and flowing into the passage (531).

Figure 3:
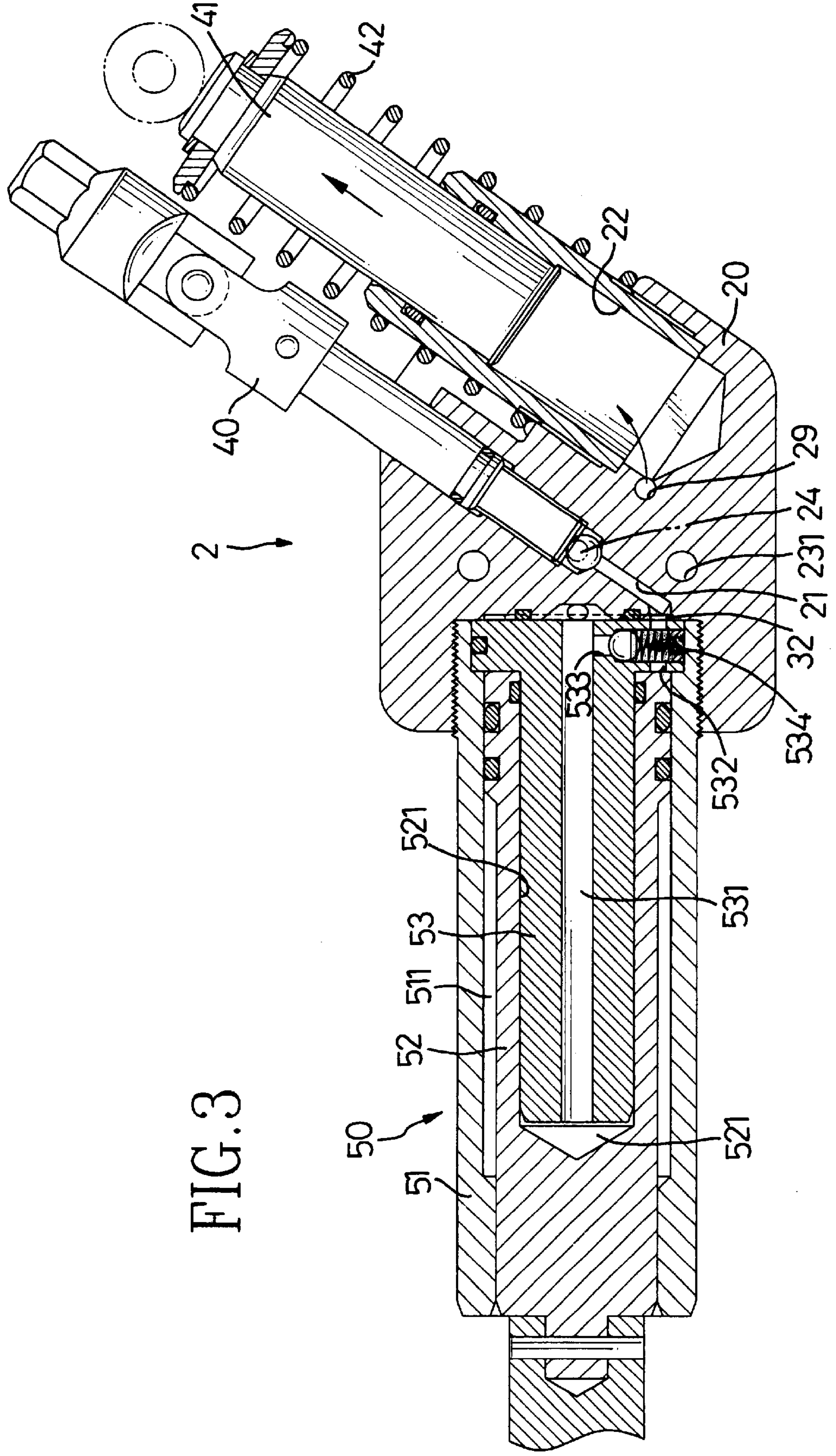
FIG. 3 is a side plan view in partial section of the hydraulic jack in FIG. 1.
Figure 4:
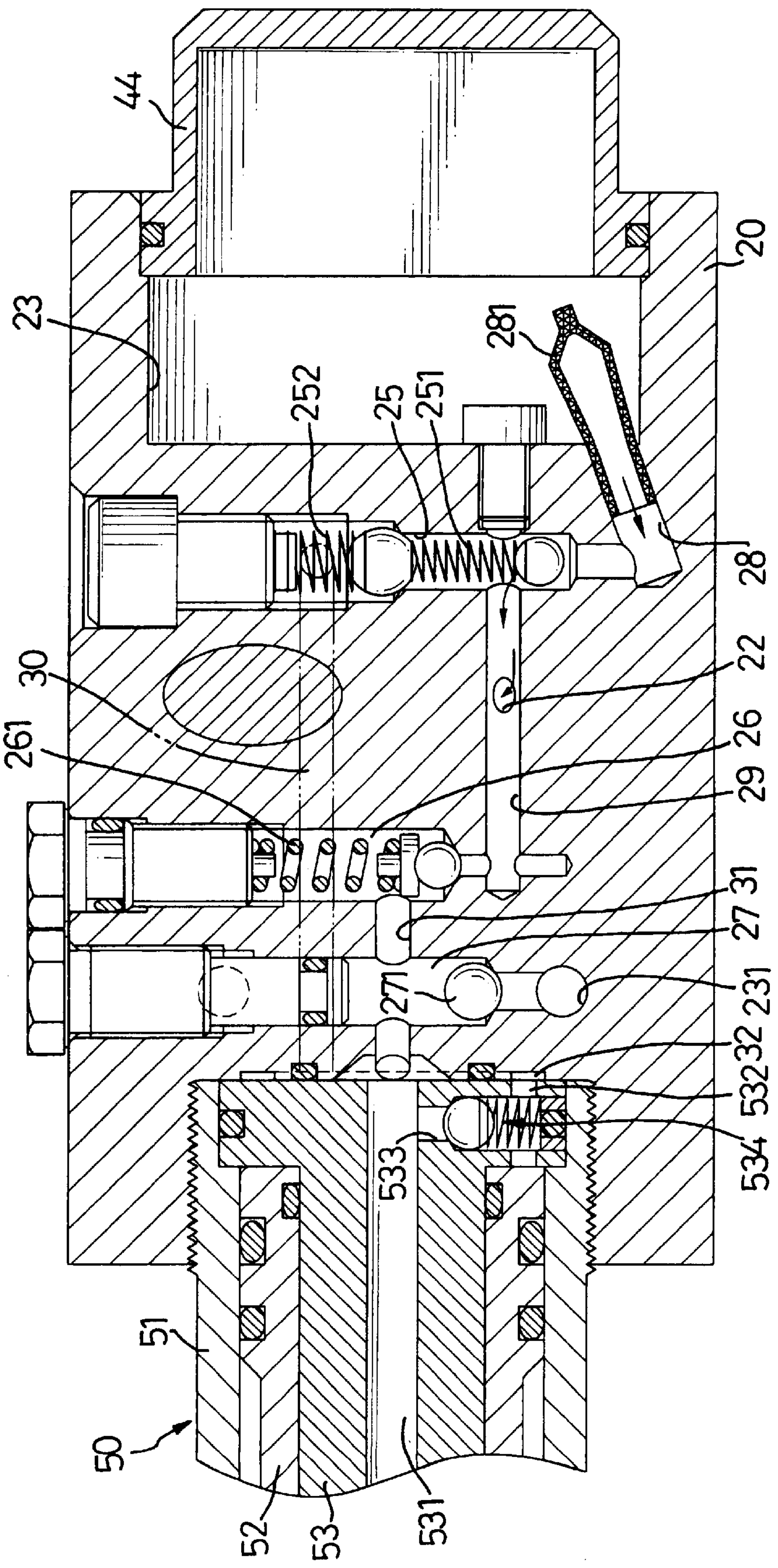
FIG. 4 is a side sectional view of the hydraulic jack in FIG. 2 along line 4—4.

With reference to FIGS. 3 and 4, when the handle (12) is lifted, the fluid in the recess (23) is drawn into the fluid chamber (22) via the second path (28), the first vertical path (25) and the first horizontal path (29). At the same time the first ball check valve (251) is lifted by the vacuum formed in the fluid chamber (22) to allow the fluid to enter the fluid chamber (22).

Figure 5:
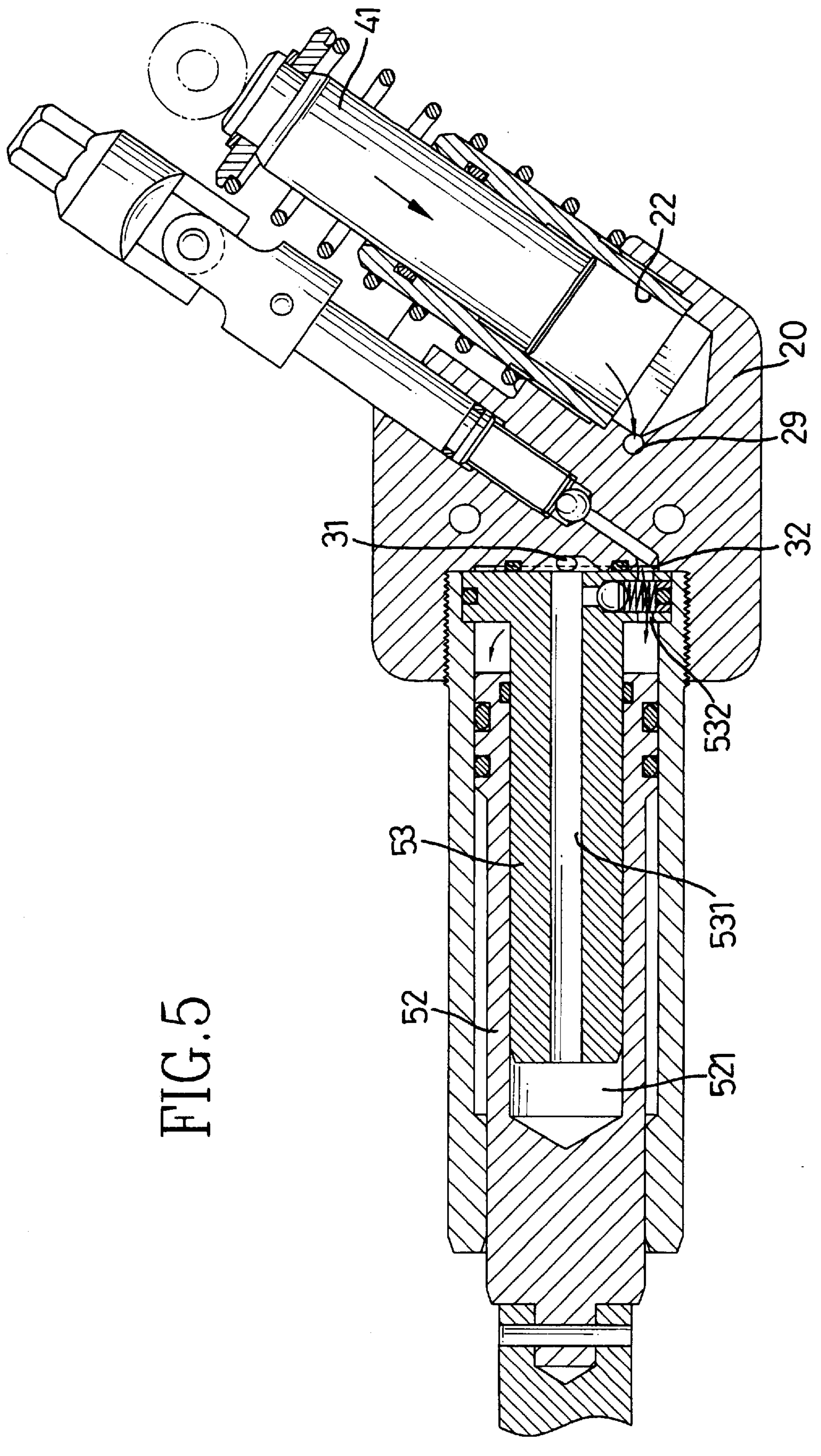
FIG. 5 is a side plan view in partial section of the hydraulic jack in FIG. 3 in a low-load condition.
Figure 6:
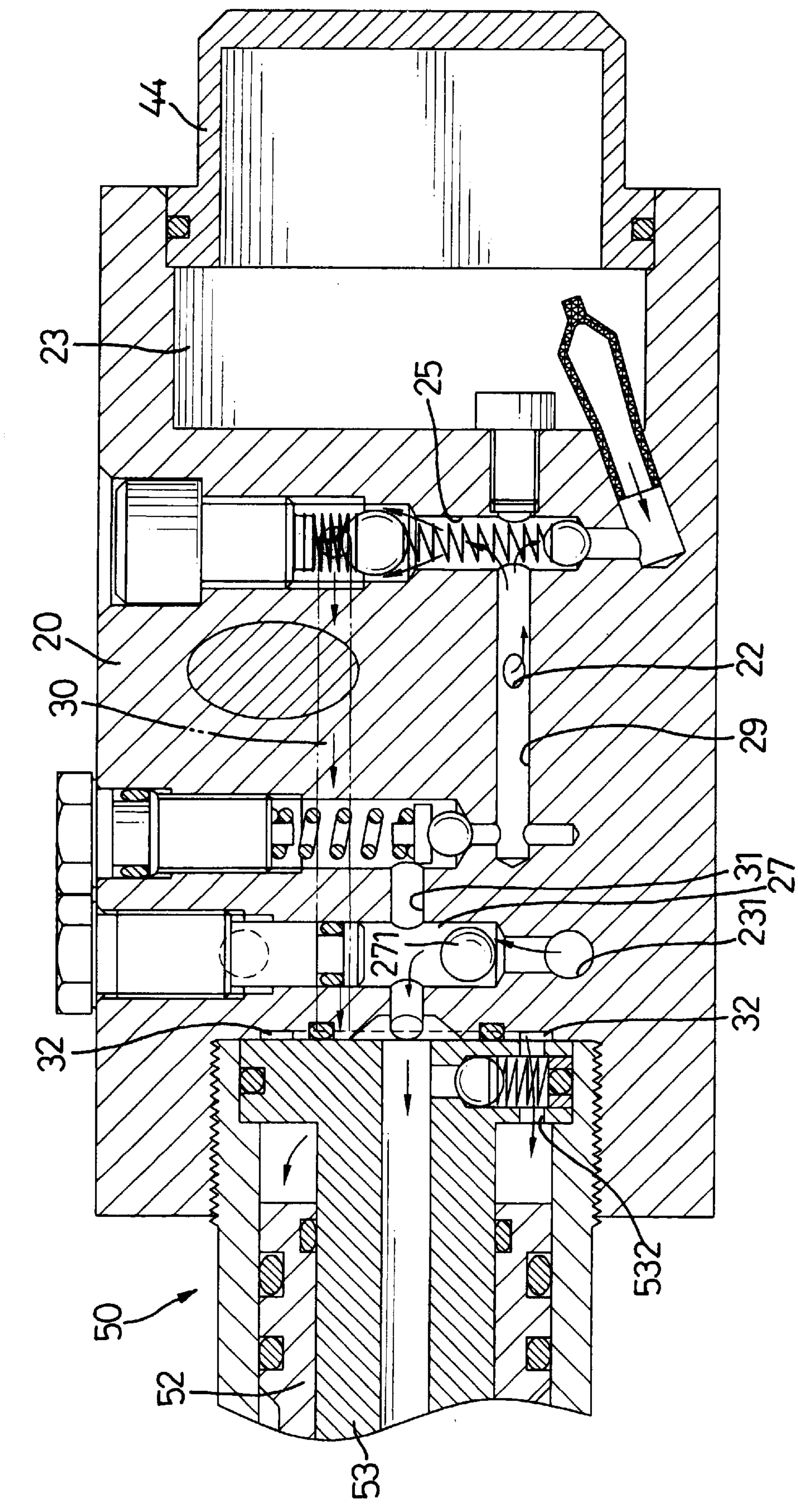
FIG. 6 is side sectional view of the hydraulic jack in FIG. 2 along line 4—4 in a low-load condition.

With reference to FIGS. 5 and 6, when the jack is in a low-load condition, the handle (12) and the drive piston (41) are then pushed to compress the fluid in the fluid chamber (22). The pressure of the hydraulic fluid pushes the first pressure control valve (252) open so that the hydraulic fluid flows into the cylinder (51) to push the piston (52) via the first horizontal path (29), the first vertical path (25), the second horizontal path (30) and the groove (32). The piston (52) moves and lifts the lift arm (11). At the same time the fluid in the recess (23) is drawn into the second chamber (521) via the first path (231) and the third vertical path (27) by the vacuum formed in the second chamber (521).

Figure 7:
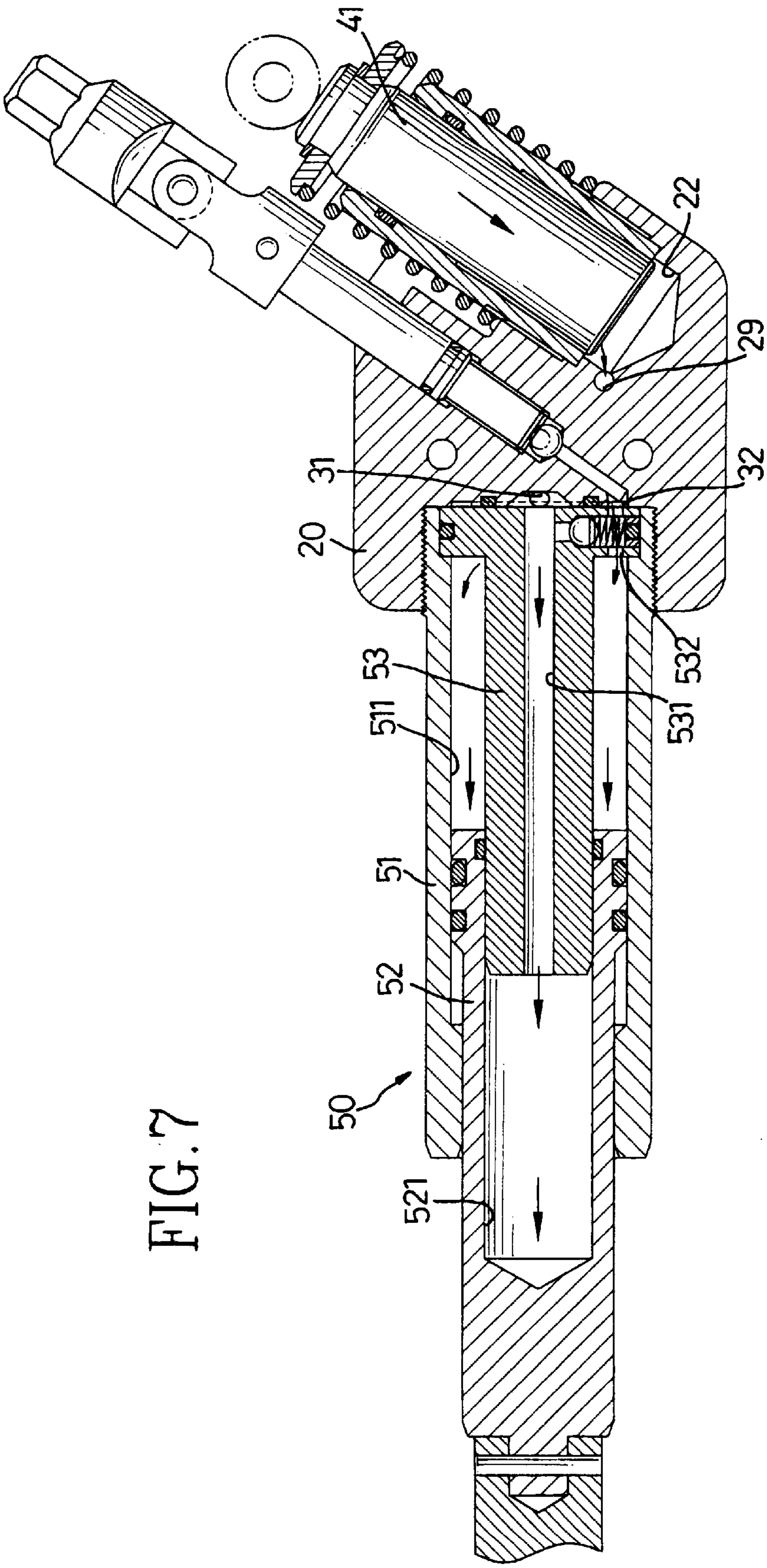
FIG. 7 is a side plan view in partial section of the hydraulic jack in FIG. 3 in a high-load condition.
Figure 8:
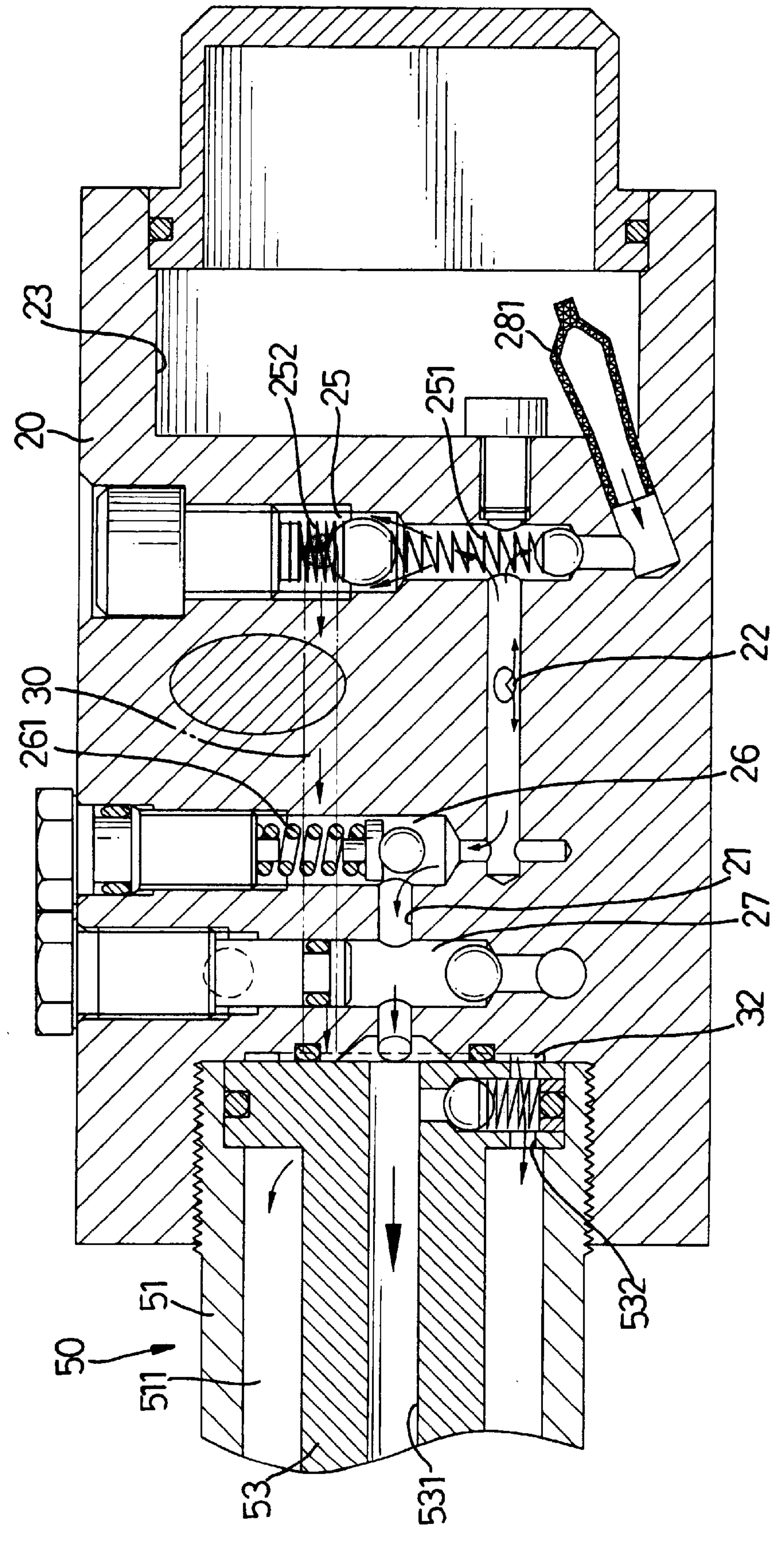
FIG. 8 is side sectional view of the hydraulic jack in FIG. 2 along line 4—4 in a high-load condition.

With reference to FIGS. 7 and 8, when the jack is in a high-load condition, the handle (12) and the drive piston (41) are then pushed to compress the fluid in the fluid chamber (22). The power formed by the cylinder (51) is not enough to lift the object on the lift arm (11) so the pressure in the cylinder (51) and the paths becomes higher than that in a low-load condition. The high pressure pushes the second pressure control valve (261) and opens the second vertical path (26). Then the fluid is drawn into the passage (531) and the second chamber (521) via the first horizontal path (29), the second vertical path (26) and the third horizontal path (31). The pressure in the passage (531) and the cylinder (51) are equal because the fluid in the passage (53 1) can be drawn into the cylinder (51) when the pressure is great enough to open the third ball check valve (534). Then the piston (52) can output a greater force to overcome the high-load condition because the piston (52) is driven by the fluid which is in the passage (531) and the cylinder (51) at the same time.

Figure 9:
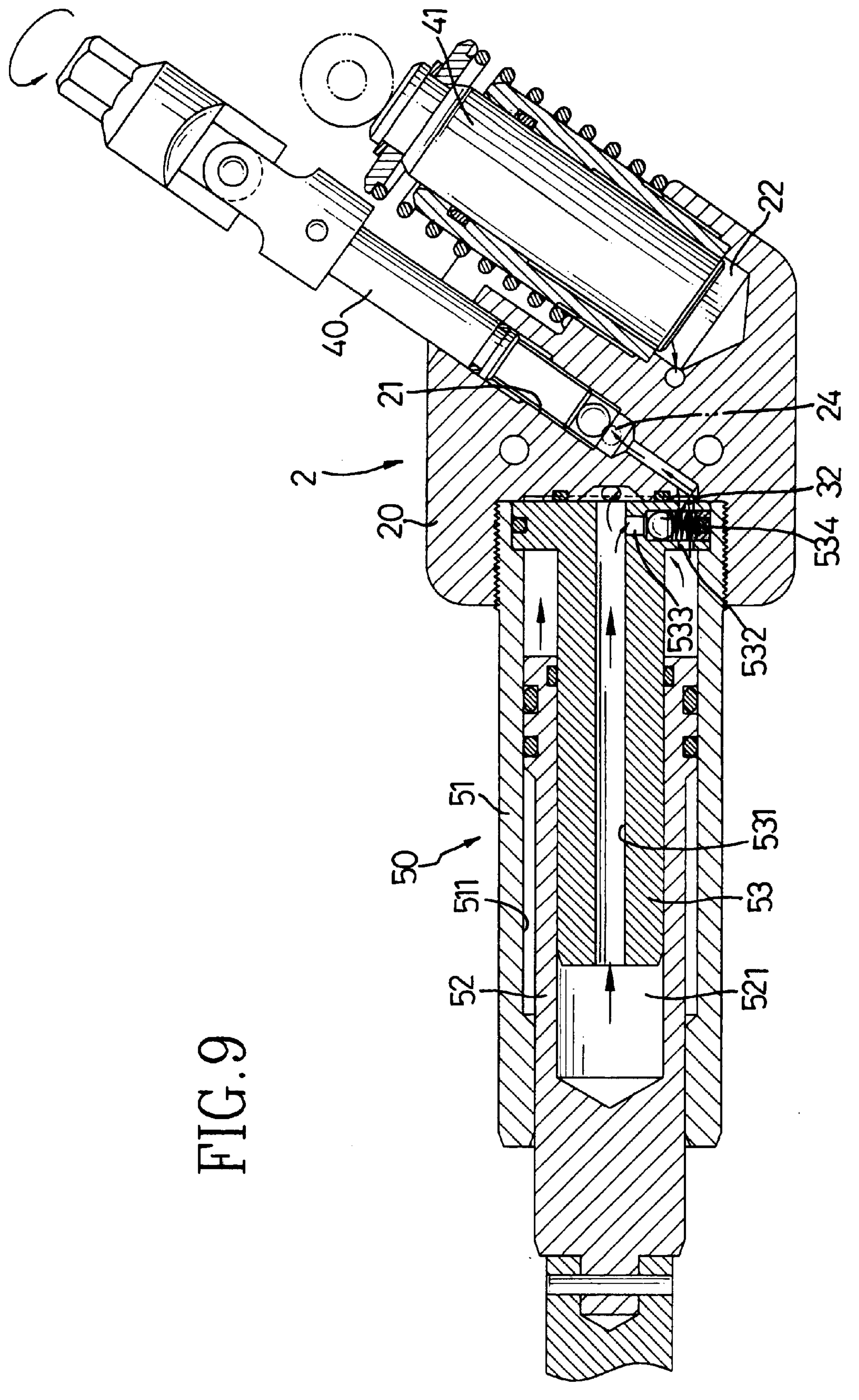
FIG. 9 is a side plan view in partial section of the hydraulic jack in FIG. 3 in a releasing condition.
Figure 10:
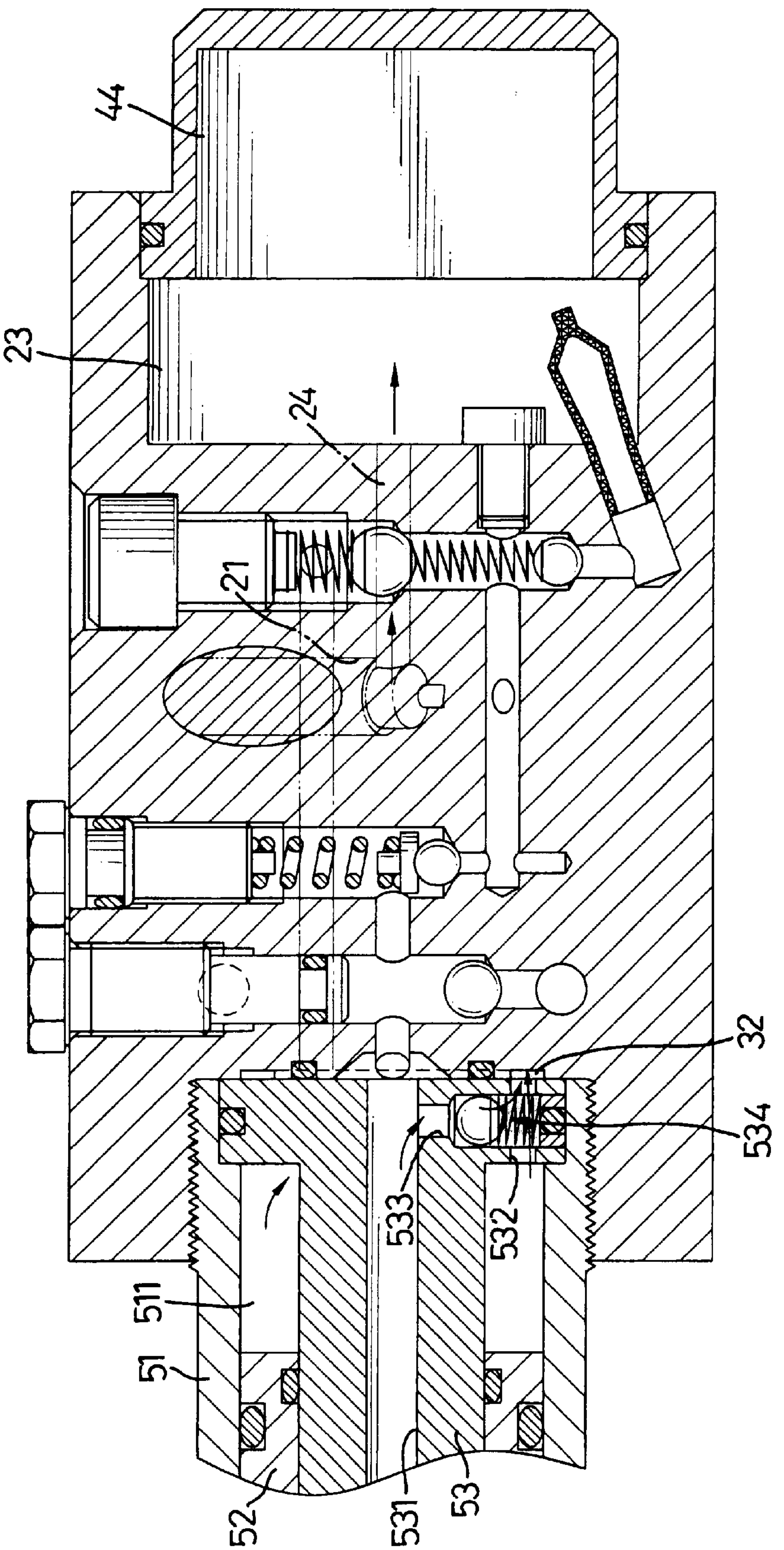
FIG. 10 is side sectional view of the hydraulic jack in FIG. 2 along line 4—4 in a releasing condition.

With reference to FIGS. 9 and 10, when lowering the object on the lift arm (11), the release valve (40) is screwed up to allow the release path (21) and the reversed path (24) to communicate. The weight of the object pushes the piston (52) back, and the hydraulic fluid in the second chamber (521) flows into the cylinder (51) via the passage (531) and the through hole (533). At the same time the hydraulic fluid in the cylinder (51) is drawn into the recess (23) via the groove (32), the release path (21) and the reverse path (24) thereby the object can be lowered slowly to promote the safety of the jack.

Although the invention has been explained in relation to its preferred embodiment, it is to be understood that many other possible modifications and variations can be made without departing from the spirit and scope of the invention as hereinafter claimed.

What is claimed is:

1. A hydraulic jack comprising:

a base seat (10) including a lift arm (11) and a handle (12) pivotally mounted on the base seat (10);

a hydraulic driver (2) mounted on said base seat (10) under said handle (12) and including a base member (20), said base member (20) having a piston assembly (50) mounted on one end and a fluid chamber (22) and a release path (21) contained in the other end, said release path (21) extending to said piston assembly (50) said base member (20) having two opposite sides each having a recess (23) defined therein, each of recesses (23) having a container (44) mounted thereon;

a first path (231) defined in said base member (20) to communicate with said two recesses (23) of said base member (20);

a release valve (40) mounted on said base member (20) to communicate with said release path (21) and partially extending out from said base member (20);

a drive piston (41) slidably mounted in said fluid chamber (22) to pump the fluid into said jack;

a spring (42) compressively mounted around said drive piston (41);

a reversed path (24) defined in said base member (20) to communicate with said release path (21) and said recess (23), wherein said reversed path (24) is always closed by said release valve (40) unless lowering the jack;

a first, second and third vertical path (25, 26, 27) each defined in said base member (20) and having a first end, a second end and a middle portion; a first, second and third horizontal path (29,30,31), said second end of said first vertical path (25) connecting to said recess (23) via a second path (28) defined in said base member (20), said first horizontal path (29) communicating with said middle portion of said first vertical path (25) and said second end of said second vertical path (26), said first horizontal path (29) having a middle portion defined to communicate with said fluid chamber (22), said second horizontal path (30) communicating with said first end of said first vertical path (25) and said piston assembly (50), said second end of said third vertical path (27) communicating with said first path (231), said third horizontal path (31) communicating with said first end of said second vertical path (26) and said third vertical path (27) to allow fluid flowing into said piston assembly (50) via said third vertical path (27);

a first ball check valve (251) mounted in said first vertical path (25) between said second path (28) and said first horizontal path (29) to prevent the hydraulic fluid from reversing and flowing into said recess (23) through said second path (28);

a first pressure control valve (252) mounted in said first vertical path (25) between said first horizontal path (29) and said second vertical path (30) to prevent the hydraulic fluid from reversing and flowing into said fluid chamber (22) through said first horizontal path (29);

a second pressure control valve (261) mounted in said second vertical path (26) between said first and said second horizontal paths (29, 30) to prevent the hydraulic fluid from reversing and flowing into said fluid chamber (22) via said first horizontal path (29);

a second ball check valve (271) is mounted in said third vertical path (27) between said first path (231) and said third horizontal path (31) to prevent the hydraulic fluid from reversing and flowing into said recess via said first path (231);

a groove (32) defined at the junction between said base member (20) and said piston assembly (50) and communicating with said second horizontal path (30) and said release path (21);

a cylinder (51) mounted on said base member (20) and a first chamber (511) defined in said cylinder (51);

a piston (52) slidably mounted in said first chamber (511) of said cylinder (51) and partially extending through said cylinder (511) to connect to said lift arm (11); a second chamber (521) defined in said piston;

an internal rod (53) securely mounted in said first chamber (51) and received in said second chamber (521) of said piston (52);

a passage (531) defined along an axis in said internal rod (53), said passage (531) communicating with said third horizontal path (31) via said third vertical path (27);

an inlet (532) defined in one end of said internal rod (53) near said base member (20) to communicate with said groove (32) and said first chamber (511);

a through hole (533) defined to communicate with said inlet (532) and said passage (531); and a third ball check valve (534) mounted in said through hole (533) to allow the hydraulic fluid to flow from said passage (531) to said inlet (532) and prevent the hydraulic fluid from reversing and flowing into said passage (531).

2. The hydraulic jack as claimed in claim 1, wherein said base member includes a filter net (281) mounted between said second path (28) and said recess (23) to prevent impurities flowing into said paths of said hydraulic driver (2).

* * * * *